United States Patent [19]
Pirk et al.

[11] 3,740,863
[45] June 26, 1973

[54] APPARATUS FOR OBTAINING WATER-FREE URANIUM COMPOUNDS

[76] Inventors: Hans Pirk, 7 Morickestrasse, Dornigheim; Fritz Ploger, 1 Konigsbergerstrasse, Kleinostheim; Horst Vietzke, 1 Grunaustrasse, Grosseauheim, all of Germany

[22] Filed: May 9, 1969

[21] Appl. No.: 823,418

[52] U.S. Cl.................. 34/57 A, 34/69, 210/68, 210/152, 23/353
[51] Int. Cl....................... F26b 17/00, B01d 37/00
[58] Field of Search................... 210/152, 181, 182, 210/183, 251, 259, 260, 261, 262, 396, 68; 55/474, 34, 79, 390; 34/10, 57 A, 69

[56] References Cited
UNITED STATES PATENTS

| | | | |
|---|---|---|---|
| 2,497,501 | 2/1950 | Himmel et al. | 34/10 |
| 2,921,970 | 1/1960 | Gilmore | 55/79 |
| 2,992,065 | 7/1961 | Feustel | 55/79 |
| 3,494,046 | 2/1970 | Harkreader | 34/57 A |

*Primary Examiner*—Charles N. Hart
*Attorney*—Cushman, Darby & Cushman

[57] ABSTRACT

There is provided an apparatus for the recovery of powdered water-free uranium compounds from suspensions. The apparatus includes a filter, preferably a rotating horizontal suction filter connected to a fluidized bed.

8 Claims, 2 Drawing Figures

APPARATUS FOR OBTAINING WATER-FREE URANIUM COMPOUNDS

In the production of nuclear fuel in the wet chemical manner there results a precipitate suspension by the precipitation of uranium from aqueous solution which must become subjected to the specific conditions of nuclear safety in the process step of the solid-liquid separation and in the subsequent oven process in the case of uranium enriched with U–235.

Apparatuses which correspond to these conditions have dimensions (safe diameters by cylindrical measurements or safe layer thicknesses) which guarantee specific arrangements with reference to the particular degree of enrichment. For these reasons most of the apparatuses known in process engineering for the working up of the enriched uranium cannot be used. In order, however, to make possible the economical production of large amounts of uranium compounds slightly enriched in U–235 under these conditions apparatuses were developed according to the present invention keeping the advancing process techniques in mind. Besides the improved economy it is also to be emphasized that the apparatus of the invention produces better product quality.

Figure 1:
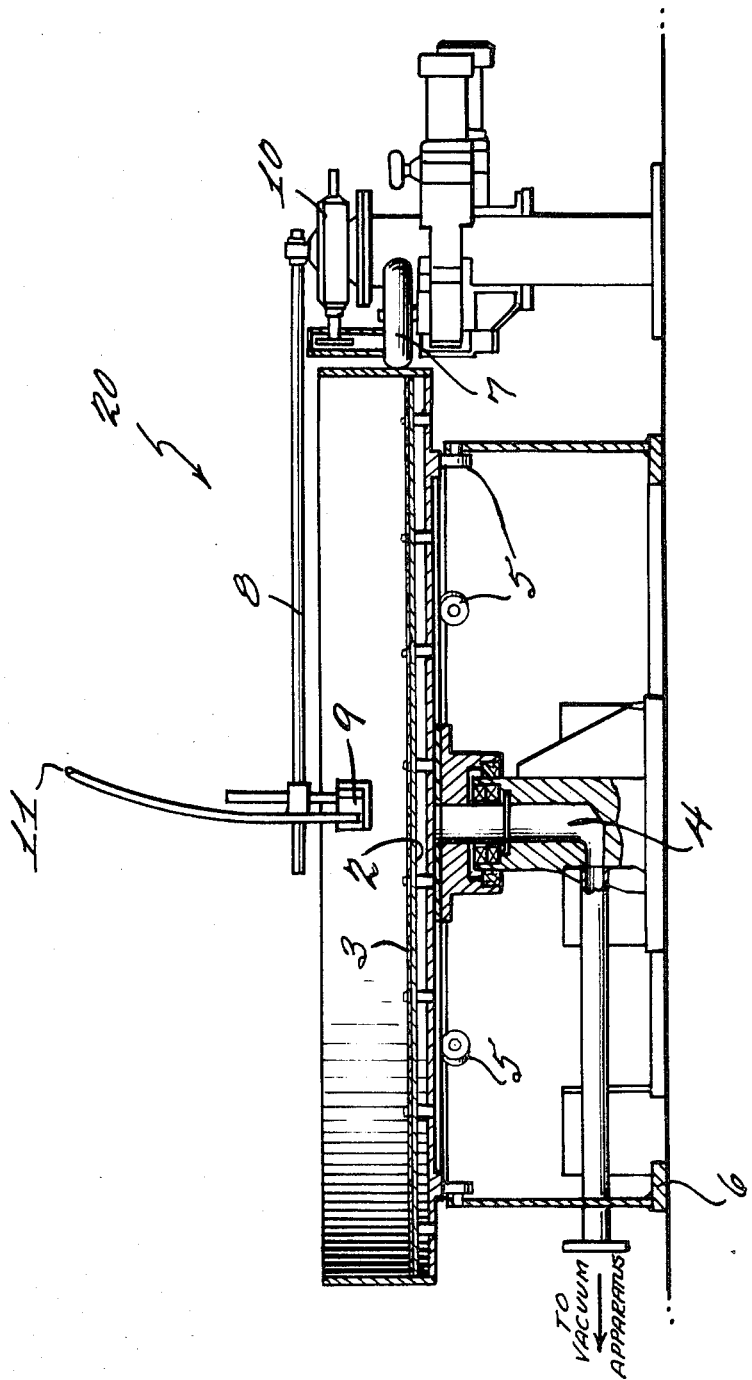
Figure 2:
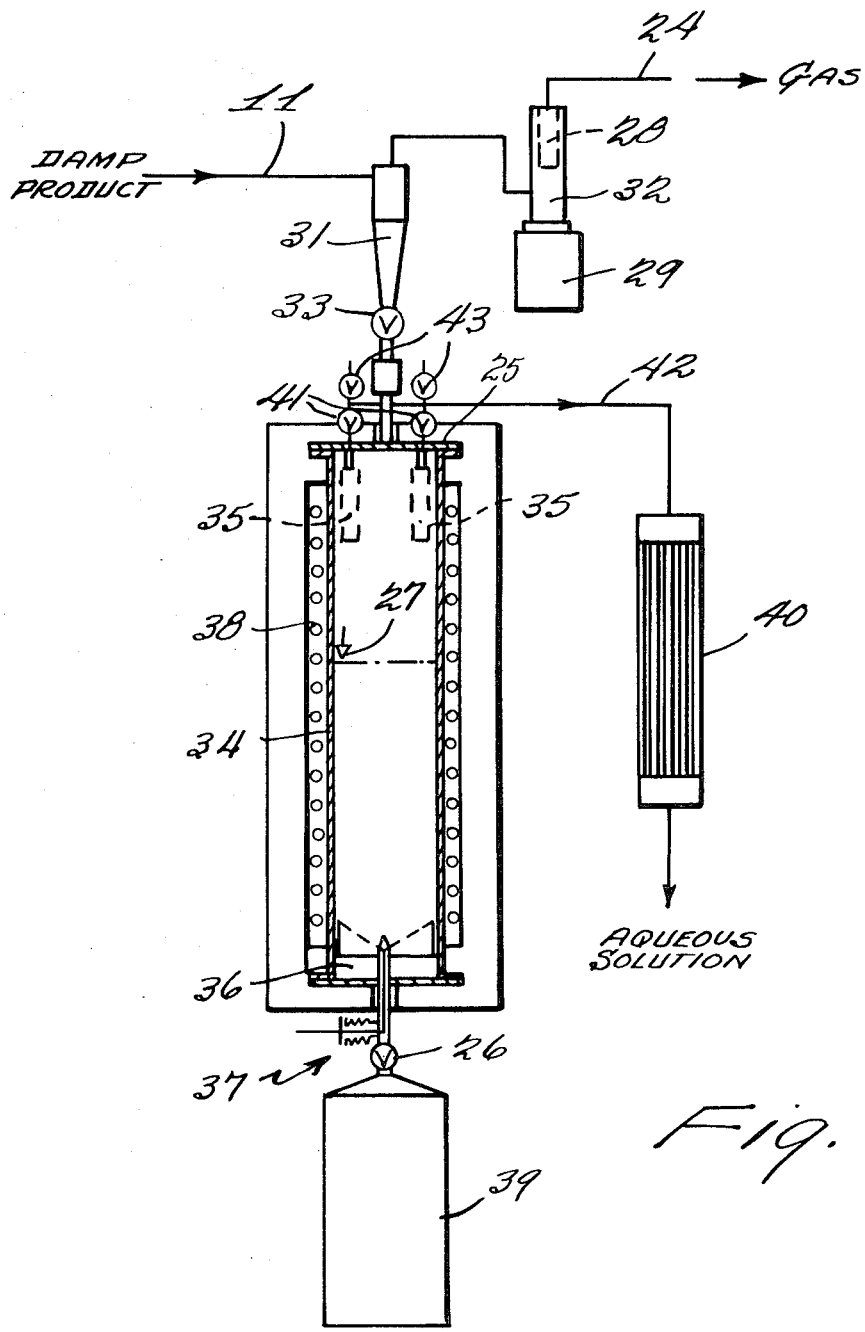

The invention will be understood best in connection with the drawings wherein:

FIG. 1 is a schematic view partially in section of a suction filter for filtration of the suspension and washing of the filter cake; and FIG. 2 is a schematic view of the fluidized bed device for thermal treatment of the wet suction filter product.

According to the apparatus of the invention an aqueous suspension is pumped from the precipitation vessel onto a horizontal suction filter rotating around the perpendicular central axis.

The border height of the filter is so regulated that the specific layer thickness will not be exceeded. FIG. 1 shows a schematic representation of this filter. After completion of the filtration the precipitate is washed by spraying thereon several times with wash solution. After the end of the washing the automatic continuous removal of the filter cake is begun. This is accomplished with the rotating filter through a paring knife moving slowly from the center to the periphery of the filter. Thereby the filter cake is removed in thin layers over the entire cake thickness and immediately is pneumatically sucked off. The control of the advancing of the paring knife is dependent upon the reaction temperature prevailing in the fluidized bed.

The suction damp filter cake expedited through pneumatic suction conveyance is separated from the conveyor air stream in a separator (cyclone or turning separator) and is introduced into the fluidized bed device through a valve gas lock.

The cylindrical fluidized bed apparatus with a safe diameter is heated from the outside by electrical free radiation heating and is closed below with a flow base made of sintered metal. In this base there is inserted a discharge apparatus for intermittently or continuously taking the product. The product is collected in an after situated container. Above the fluidized bed sintered metal filters are fastened on the container cover, which cause a nearly complete separation of the dust from the waste gases. The filters are back blown at fixed intervals of time to remove the deposited layer of powder. The waste gases are condensed in an after situated surface condenser or wash tower and/or are absorbed.

Referring more specifically to FIG. 1 of the drawings there is provided a suction filter designated generically at 20 consisting of a rotating dish having a perforated plate bottom 2 and a filter cloth 3 thereon. This rotating dish having a central discharge filtrate discharge tube 4 rests on rollers 5 in the round foundation 6 of the filter. The filtrate discharge tube 4 is connected to the vacuum apparatus (not shown). The rotating plate is driven by a continuously variable friction disk drive 7. The paring knife 9 which is horizontally and vertically adjustable secured to an overhanging supporting arm 8 is driven from a paring knife support located outside of the rotating plate and travels slowly on a circular form or straight track from the center to the periphery of the rotating plate. The powder is sucked off through a flexible conveyor line 11 projecting into the paring knife.

As shown in FIG. 2 the product transported through the flexible conveyor line 11 from the apparatus of FIG. 1 is separated in a separation system consisting of a cyclone 31 and subsequent filter arrangement 32 (or a reversing separator with integrated filter system) from the carrier gas which latter is removed through line 24 as waste gas. The filter arrangement includes a filter 28 permeable to gases while entrained solids are retained and collect in vessel 29. The powdered product obtained in the cyclone is introduced into the fluidized bed apparatus through a valve gas lock 33 comprising, for example, flexible bellow valves. The powdered product after passing through the valve gas lock goes into a vertical, cylindrical reaction chamber 34 which is closed at the top by a flange cover 25 having fastened thereto back blowable filter candles 35 made of porous sintered metal and closed at the bottom by a flow floor 36 made of porous sintered metal with a central delivery conduit 37. The solids are whirled up to a height indicated at 27 by the carrier gas coming through conduit 37.

The heating of the reaction container is accomplished by a free radiant clam shell heating system which can comprise several heating circuits 38. The finished product is continuously or intermittently withdrawn, e.g., through valve 26 and collected in a coolable container 39. The reaction and carrier gases after passing through the sintered metal filters 35 are free of dust and are lead through valves 41 to an after connected condenser 40, for example a surface condenser or wash tower, via conduit 42 and are condensed and/or absorbed. When it is desired to clean the filter candles 35 gas is passed through valves 43.

The apparatus is particularly useful in obtaining water free uranium tetrafluoride.

We claim:

1. Apparatus for obtaining dry nuclear pure powdered uranium compounds from suspensions comprising: a vertically disposed fluidized bed vessel of nuclear safe geometry having an inlet for fluidizing gas in the form of a sintered metal floor; radiant clam shell means for heating the wall of said vessel; inlet means for feeding moist powder in solid form into the upper end of said vessel; outlet means for withdrawing dry powder from the lower end of said vessel; gas-permeable porous filter means disposed within said vessel near the upper end thereof; gas outlet conduit means extending from said filter means for conveying fluidizing gas from said vessel.

2. Apparatus as in claim 1 wherein said filter means includes a sintered metal filter element.

3. Apparatus as in claim 2 including valve and conduit means for introducing gas from outside said vessel through said filter means into said vessel for cleaning said filter means.

4. Apparatus as in claim 3 including means for recovering the off-gases from said vessel connected to said gas outlet conduit means.

5. Apparatus as in claim 4 wherein said recovery means includes a condenser.

6. Apparatus as in claim 1 wherein said inlet means for feeding moist powder into said fluidized bed vessel includes a gas-solid separator having a gas-solids suspension inlet, a gas outlet, and a solids outlet in communication with said vessel.

7. Apparatus for obtaining dry nuclear pure uranium compounds comprising: a suction filter for preparing moist powder, said suction filter having a rotating perforated-bottom dish for retaining a body moist powder, a suction conduit for removing liquid from the perforated bottom, a paring knife disposed above the dish and movable between the center and the periphery of the dish for removing a thin layer from the top of the body of moist powder; pneumatic conveying means including a conduit for conveying the removed moist powder from the dish, a vertically disposed fluidized bed vessel of nuclear safe geometry having an inlet for fluidizing gas; means for heating said vessel; inlet means connected to said pneumatic conveying means for feeding moist powder into said vessel; outlet means for withdrawing dry powder from said vessel; gas-permeable porous filter means disposed within said vessel near the upper end thereof; gas outlet conduit means extending from said filter means for conveying fluidizing gas from said vessel.

8. Apparatus as in claim 7 including a gas-solids separator disposed outside said vessel, said separator having an inlet in communication with said conveying conduit and a solids outlet in communication with the inlet means associated with said vessel.

* * * * *

UNITED STATES PATENT OFFICE
CERTIFICATE OF CORRECTION

Patent No. 3,740,863                  Dated May 1, 1973

Inventor(s) Hans Pirk, Fritz Ploger, Horst Vietzke

It is certified that error appears in the above-identified patent and that said Letters Patent are hereby corrected as shown below:

In the heading, please add:

--Claims priority, Application

Germany   P 17 67 549.9-41 filed May 21, 1968--.

Signed and sealed this 20th day of August 1974.

(SEAL)
Attest:

McCOY M. GIBSON, JR.
Attesting Officer

C. MARSHALL DANN
Commissioner of Patents